(12) United States Patent
Diop et al.

(10) Patent No.: US 10,354,063 B2
(45) Date of Patent: Jul. 16, 2019

(54) PROTECTION OF A MODULAR CALCULATION

(71) Applicant: STMicroelectronics (Rousset) SAS, Rousset (FR)

(72) Inventors: Ibrahima Diop, Marseilles (FR); Pierre-Yvan Liardet, Peynier (FR); Yanis Linge, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 162 days.

(21) Appl. No.: 15/442,303

(22) Filed: Feb. 24, 2017

(65) Prior Publication Data

US 2018/0060566 A1    Mar. 1, 2018

(30) Foreign Application Priority Data

Aug. 23, 2016    (FR) ..................................... 16 57860

(51) Int. Cl.
    *G06F 21/52*      (2013.01)
    *G06F 7/523*      (2006.01)
    *G06F 7/72*      (2006.01)

(52) U.S. Cl.
    CPC .............. *G06F 21/52* (2013.01); *G06F 7/523* (2013.01); *G06F 7/72* (2013.01); *G06F 7/723* (2013.01);
(Continued)

(58) Field of Classification Search
    CPC . G06F 21/52; G06F 7/523; G06F 7/72; G06F 2221/032
See application file for complete search history.

(56) References Cited

U.S. PATENT DOCUMENTS

| 6,008,075 A | 12/1999 | Lien et al. |
| 8,139,763 B2 | 3/2012 | Boscher et al. |

(Continued)

FOREIGN PATENT DOCUMENTS

| FR | 2 875 355 A1 | 3/2006 |
| GB | 2 399 904 A | 9/2004 |

OTHER PUBLICATIONS

U.S. Appl. No. 15/442,322, filed Feb. 24, 2017, Protection of a Modular Exponentiation Calculation.

(Continued)

*Primary Examiner* — Harunur Rashid
(74) *Attorney, Agent, or Firm* — Seed IP Law Group LLP

(57) ABSTRACT

A method of protecting a modular calculation on a first number and a second number, executed by an electronic circuit, including the steps of: combining the second number with a third number to obtain a fourth number; executing the modular calculation on the first and fourth numbers, the result being contained in a first register or memory location; initializing a second register or memory location to the value of the first register or to one; and successively, for each bit at state 1 of the third number: if the corresponding bit of the fourth number is at state 1, multiplying the content of the second register or memory location by the inverse of the first number and placing the result in the first register or memory location, if the corresponding bit of the fourth number is at state 0, multiplying the content of the second register or memory location by the first number and placing the result in the first register or memory location.

30 Claims, 2 Drawing Sheets

(52) U.S. Cl.
CPC ........... *G06F 2207/7242* (2013.01); *G06F 2221/032* (2013.01)

(56) References Cited

U.S. PATENT DOCUMENTS

| | | | |
|---|---|---|---|
| 9,014,368 B2 | 4/2015 | Teglia | |
| 2005/0078821 A1* | 4/2005 | Jin | G06F 7/723 380/46 |
| 2008/0175385 A1* | 7/2008 | Lee | H04B 10/70 380/256 |
| 2009/0067617 A1* | 3/2009 | Trichina | G06F 7/723 380/28 |
| 2009/0092245 A1 | 4/2009 | Fumaroli et al. | |
| 2014/0281573 A1* | 9/2014 | Jaffe | G06F 21/72 713/189 |
| 2015/0063561 A1 | 3/2015 | Teglia | |

OTHER PUBLICATIONS

Choi et al., "An Improved Square-always Exponentiation Resistant to Side-channel Attacks on RSA Implementation," *Intelligent Automation & Soft Computing* 22(3):353-363, 2016.

French Search Report, dated Mar. 9, 2018, for French Application No. 1757037, 8 pages.

Ha et al., "Power Analysis Attacks on the Right-to-Left Square-Always Exponentiation Algorithm," *Journal of Internet Services and Information Security* 4(4):38-51, 2014.

Clavier et al., "Horizontal Correlation Analysis on Exponentiation," *Twelfth International Conference on Information and Communications Security*, Barcelona, Spain, Dec. 2010, 19 pages.

Feix et al., "Side-Channel Analysis on Blinded Regular Scalar Multiplications," *Proceedings of INDOCRYPT 2014*, Jan. 1, 2014, 25 pages.

French Search Report, dated Jul. 31, 2017, for French Application No. 1657860, 8 pages.

French Search Report, dated Jun. 23, 2017, for French Application No. 1657861, 8 pages.

Joye et al., "The Montgomery Powering Ladder," *Cryptographic Hardware and Embedded Systems International Workshop 2002*, Aug. 13, 2002, 12 pages.

Lesavourey et al., "Efficient Randomized Regular Modular Exponentiation using Combined Montgomery and Barrett Multiplications," *Thirteenth International Conference on Security and Cryptography*, Lisbon, Portugal, Jul. 2016, 9 pages.

* cited by examiner

PROTECTION OF A MODULAR CALCULATION

BACKGROUND

Technical Field

The present disclosure generally relates to electronic circuits and, more specifically, to circuits executing operations of modular exponentiation or of multiplication by a scalar on elliptic curves. The present disclosure more specifically relates to the protection of such calculations against attacks aiming at discovering quantities manipulated by the calculations.

Description of the Related Art

In many applications, electronic circuits implement algorithms of encryption, authentication, signature calculation, and more generally algorithms manipulating data, called secret data, that is, the access to which is desired to be reserved to certain users or circuits. Among such algorithms, some use modular exponentiation operations, for example, RSA-type algorithms, or operations of multiplication by a scalar on elliptic curves (ECC), for example EC-DSA.

There exist many methods, called attacks, to attempt discovering or pirating secret data manipulated by such calculations. Among such attacks, so-called fault injection attacks comprise disturbing the circuit operation at specific times of the execution of the operation. The interpretation of the consequences of such fault injections on the circuit operation or on the supplied results gives the pirate information relative to the secret data. The interpretation is performed either by examining the results provided by the circuit executing the calculation or by so-called side channel attacks, which use indirect information such as the circuit power consumption (SPA, DPA attacks), its radiation, etc.

Among side-channel attacks, one can in particular distinguish attacks called vertical and attacks called horizontal. Vertical attacks comprise using the variations of a same secret quantity on a plurality of successive traces, for example, of power consumptions, recorded by having made different assumptions as to the secret quantity. Horizontal attacks comprise processing the different operations of a same trace and relative to the secret quantities. The countermeasures which are generally efficient against vertical side channel attacks are generally not efficient against horizontal attacks.

BRIEF SUMMARY

In an embodiment, a method comprises: performing, using an electronic circuit, a modular calculation on a first number and a second number, the performing the modular calculation including: combining the second number with a third number to obtain a fourth number; executing the modular calculation on the first and fourth numbers, the result being contained in a first memory location; initializing a second memory location; and successively, for each bit of the third number at a first state: if a corresponding bit of the fourth number is at a first state, a content of the second memory location is multiplied by an inverse of the first number and the result is placed in the first memory location; and if the corresponding bit of the fourth number is at a second state, the content of the second memory location is multiplied by the first number and the result is placed in the first memory location. In an embodiment, the first memory location is a first register of the electronic circuit and the second memory location is a second register of the electronic circuit. In an embodiment, when a bit of the third number is at a second state, the method proceeds to the next bit of the third number. In an embodiment, a result of the modular calculation on the first number and the second number is, after processing of a last bit of the third number, in the second memory location. In an embodiment, the third number is a random number. In an embodiment, the second number is a result of a multiplication of a fifth number by an Euler totient function of a modulo of the modular calculation. In an embodiment, the calculation is a modular exponentiation, the fifth number representing an exponent to be applied to the first number. In an embodiment, the calculation is a scalar multiplication, the fifth number being a scalar to be multiplied by the first number. In an embodiment, the calculation is a modular exponentiation, the second number representing an exponent to be applied to the first number. In an embodiment, the calculation is a scalar multiplication, the second number being a scalar to be multiplied by the first number. In an embodiment, the initializing the second memory location comprises initializing a value of the second memory location to one of: a value of the first memory location; and a value of one.

In an embodiment, a device comprises: one or more memories; and processing circuitry, which, in operation, performs a modular calculation on a first number and a second number, the performing the modular calculation including: combining the second number with a third number to obtain a fourth number; executing the modular calculation on the first and fourth numbers, storing the result in a first memory location; initializing a second memory location; and successively, for each bit of the third number at a first state: if a corresponding bit of the fourth number is at a first state, a content of the second memory location is multiplied by an inverse of the first number and the result is stored in the first memory location; and if the corresponding bit of the fourth number is at a second state, the content of the second memory location is multiplied by the first number and the result is stored in the first memory location. In an embodiment, the first memory location is a first register of the one or more memories and the second memory location is a second register of the one or more memories. In an embodiment, a result of the modular calculation on the first number and the second number is, after processing of a last bit of the third number, in the second memory location. In an embodiment, the third number is a random number. In an embodiment, the second number is a result of a multiplication of a fifth number by an Euler totient function of a modulo of the modular calculation. In an embodiment, the calculation is a modular exponentiation, the fifth number representing an exponent to be applied to the first number. In an embodiment, the calculation is a scalar multiplication, the fifth number being a scalar to be multiplied by the first number. In an embodiment, the calculation is a modular exponentiation, the second number representing an exponent to be applied to the first number. In an embodiment, the calculation is a scalar multiplication, the second number being a scalar to be multiplied by the first number. In an embodiment, the initializing the second memory location comprises initializing a value of the second memory location to one of: a value of the first memory location; and a value of one.

In an embodiment, a system comprises: one or more processing cores, which in operation, process digital data; and cryptographic circuitry, coupled to the one or more processing cores, wherein the cryptographic circuitry, in operation, performs a modular calculation on a first number and a second number, the performing the modular calculation including: combining the second number with a third number, obtaining a fourth number; executing the modular calculation on the first and fourth numbers, storing a result in a first memory location; initializing a second memory location; and successively, for each bit of the third number at a first state: if a corresponding bit of the fourth number is at a first state, multiplying a content of the second memory location by an inverse of the first number and storing the result in the first memory location; and if the corresponding bit of the fourth number is at a second state, multiplying the content of the second memory location by the first number and storing the result in the first memory location. In an embodiment, the first memory location is a first register and the second memory location is a second register. In an embodiment, the modular calculation is one of a modular exponentiation and a scalar multiplication. In an embodiment, the initializing the second memory location comprises initializing a value of the second memory location to one of: a value of the first memory location; and a value of one. In an embodiment, the one or more processing cores, in operation, process transaction data.

In an embodiment, a non-transitory computer-readable medium has contents which cause one or more processing devices to perform a method, the method comprising: performing a modular calculation on a first number and a second number, the performing the modular calculation including: combining the second number with a third number, obtaining a fourth number; executing the modular calculation on the first and fourth numbers, storing a result in a first memory location; initializing a second memory location; and successively, for each bit of the third number at a first state: if a corresponding bit of the fourth number is at a first state, multiplying a content of the second memory location by an inverse of the first number and storing the result in the first memory location; and if the corresponding bit of the fourth number is at a second state, multiplying the content of the second memory location by the first number and storing the result in the first memory location. In an embodiment, the modular calculation is one of a modular exponentiation and a scalar multiplication. In an embodiment, the initializing the second memory location comprises initializing a value of the second memory location to one of: a value of the first memory location; and a value of one. In an embodiment, the method comprises processing transaction data.

An embodiment provides a method of calculation of a modular exponentiation or of a scalar multiplication by an electronic circuit which may facilitate addressing all or part of the disadvantages of usual methods.

An embodiment provides a calculation method efficient against horizontal attacks.

An embodiment provides a calculation method efficient against fault-injection attacks.

An embodiment provides a method of protecting a modular calculation on a first number and a second number, executed by an electronic circuit, comprising:

combining the second number with a third number to obtain a fourth number;

executing the modular calculation on the first and fourth numbers, the result being contained in a first register or memory location;

initializing a second register or memory location to the value of the first register or to one; and successively, for each bit at state 1 of the third number:
if the corresponding bit of the fourth number is at state 1, the content of the second register or memory location is multiplied by the inverse of the first number and the result is placed in the first register or memory location, if the corresponding bit of the fourth number is at state 0, the content of the second register or memory location is multiplied by the first number and the result is placed in the first register or memory location.

According to an embodiment, if the bit of the third number is 0, it is proceeded to the next bit of the third number.

According to an embodiment, the result of the modular calculation is, at the end of the iterations on the bits of the third number, in the second register or memory location.

According to an embodiment, the third number is a random number.

According to an embodiment, the second number is the result of a multiplication of a fifth number by the Euler totient function of the modulo.

According to an embodiment, the calculation is a modular exponentiation, the second or fifth number representing an exponent to be applied to the first number.

According to an embodiment, the calculation is a scalar multiplication, the second or fifth number being a scalar to be multiplied by the first number.

An embodiment provides an electronic circuit capable of implementing the methods disclosed herein.

DETAILED DESCRIPTION

Figure 1:
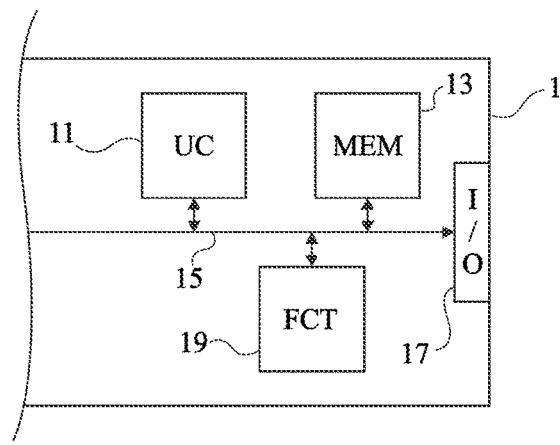
FIG. 1 schematically shows an embodiment of an electronic circuit.

The same elements have been designated with the same reference numerals in the different drawings, unless the context indicates otherwise. In particular, the structural and/or functional elements common to the different embodiments may be designated with the same reference numerals and may have identical structural, dimensional, and material properties. For clarity, only those acts and elements which are useful to the understanding of the described embodiments have been shown and will be detailed. In particular, the applications of the executed calculations or of the circuits executing them have not been detailed, the described embodiments being compatible with usual applications.

FIG. 1 very schematically shows an embodiment of an electronic circuit 1 of the type to which the embodiments which will be described apply.

Circuit 1 comprises:

a calculation unit or circuit 11 (UC), for example, a state machine, a microprocessor, a programmable logic circuit, etc.;

one or a plurality of volatile and/or non-volatile storage areas or memories 13 (MEM) for storing all or part of the data and keys;

one or a plurality of data, address, and/or control buses 15 coupled between the different elements internal to circuit 1 and an input-output interface 17 (I/O) for communicating with the outside of circuit 1.

Circuit 1 may include various other circuits according to the application, symbolized in FIG. 1 by a block 19 (FCT).

Modular exponentiation operations can be found in many encryption algorithms, among which, for example, the algorithm known as RSA.

A modular exponentiation comprises calculating result C of the exponentiation of a number M by an integer d (exponent) modulo N, that is, applying formula:

$$C=M^d(\mathrm{mod}\ N).$$

Most often:

number M represents the number (or an information representative of the number) which is desired to be encrypted, authenticated, signed, etc.; and exponent d and modulo N (pair (d, N)) represent the encryption key, the authentication key, the signature key, etc. (or information representative of the key).

In the example of application to RSA encryption, the encryption key is a pair (d, N) and the decryption key is a pair (d', N), where N is the encryption modulo and d' is the decryption exponent.

The calculation of the modular exponentiation by an electronic circuit (a state machine, a processor executing the method in the form of a program, a programmable logic circuit, etc.), for example, circuit 1, is most often performed by applying a so-called square-and-multiply method. More specifically, the calculation of a modular exponentiation according to the square-and-multiply method uses a decomposition of the exponent. Its execution by an electronic circuit may implement a technique currently called Montgomery's powering ladder.

Figure 2:
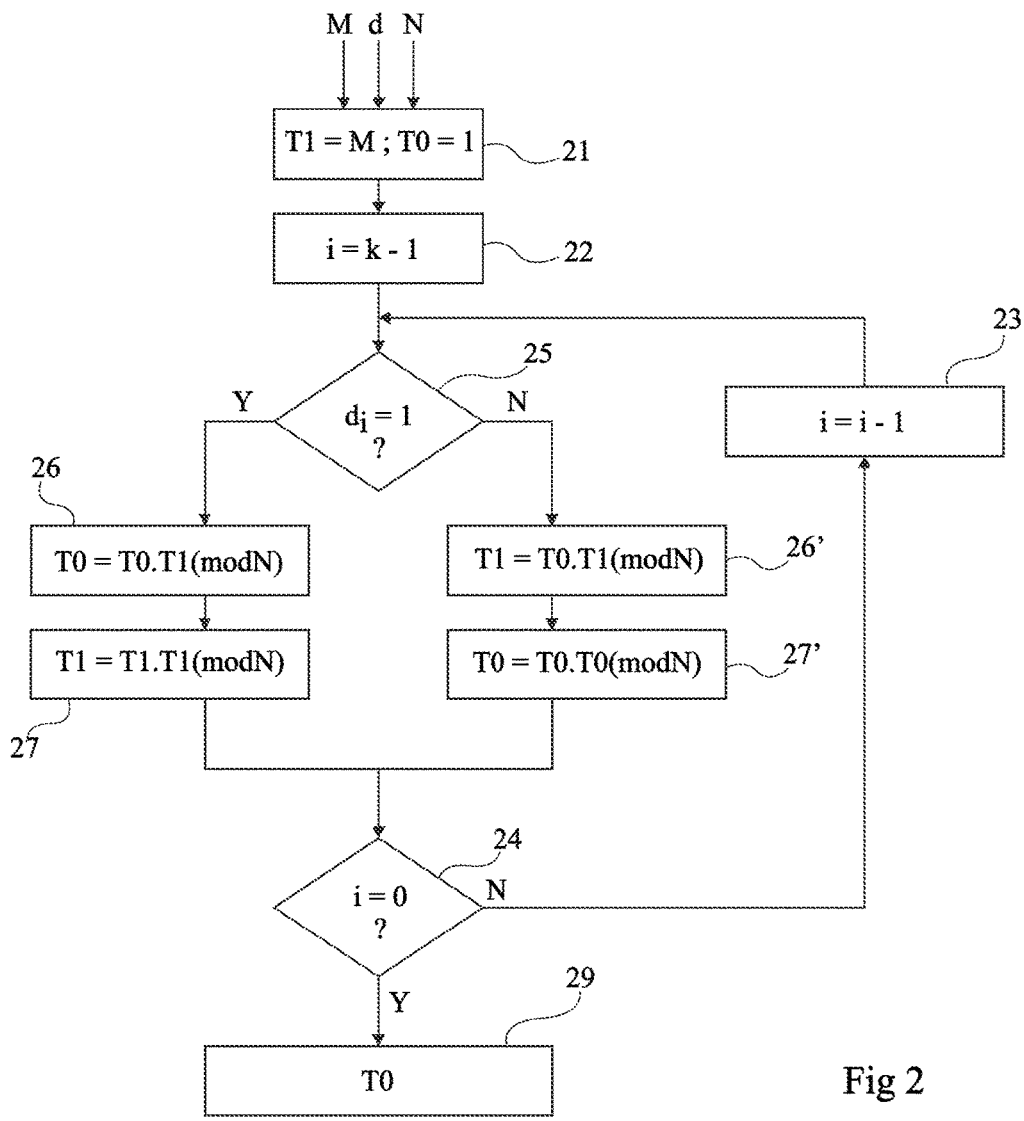
FIG. 2 shows, in the form of blocks, the steps of a calculation by the square-and-multiply method by Montgomery's ladder.

FIG. 2 shows, in the form of blocks, the steps of a calculation by Montgomery's ladder method.

The calculation uses at least two registers of circuit 1, or two memory locations, arbitrarily noted T0 and T1, on which the operations will be performed. Although, for simplification, reference will be made hereafter to registers, memory locations may also be employed.

The message, for example, number M, to be submitted to the modular exponentiation is loaded into register T1. Exponent d is read bit by bit during the calculation. Note $d_i$ each bit of exponent d, where i designates the rank from 0 to k−1, where k represents the size of exponent d.

Hereafter, for simplification, the registers and their content will be confounded, that is, when reference is made to operations on the registers, this means on the content thereof.

In a first step, (block 21, T1=M, T0=1), register T1 is thus loaded with number M and register T0 is initialized to 1.

A loop calculation on the bits of exponent d is then started. For example, a counter i is initialized to k−1 (block 22, i=k−1) and is decremented by 1 (block 23, i=i−1) each time a bit $d_i$ of the exponent is processed as long as not all the bits have been processed (block 24, i=0?).

For each iteration, that is, for each bit $d_i$, it is started by testing the value of the exponent bit (block 25, $d_i$=1?).

If current bit $d_i$ is 1 (output Y of block 25), the content of register T0 is multiplied, modulo N, by the content of register T1 and the result is placed in register T0 (block 26, T0=T0.T1 (mod N)), after which the content of register T1 is squared, modulo N, and the result is placed in register T1 (block 27, T1 =T1.T1 (mod N)). This amounts to performing the square-and-multiply operation, the product of the two registers is placed in register T0, after which the content of register T1 is replaced by its square.

If current bit $d_i$ is 0 (output N of block 25), the content of register T0 is multiplied, modulo N, by the content of register T1 and the result is placed in register T1 (block 26', T1 =T0.T1 (mod N)), after which the content of register T0 is squared, modulo N, and the result is placed in register T0 (block 27', T0=T0.T0 (mod N)). This amounts to performing the square-and-multiply operation, the product of the two registers is placed in register T1, after which the content of register T0 is replaced with its square.

As long as not all the bits of exponent d have been processed (output N of block 24), counter i is decremented (block 23) and it is returned to step 25. Once all the bits of exponent d have been processed (output Y of block 24), register T0 contains the result of the modular exponentiation (block 29, T0), that is, value $C=M^d$ (mod N).

The calculation illustrated in FIG. 2 may also be written as follows:

T0=1 (step 21)
T1=M (step 21)
For i=k−1 to 0 (steps 22 to 27):
b=1−$d_i$
Tb=T0.T1 (mod N)
$Td_i$=$Td_i$.$Td_i$ (mod N)
End of loop (output Y of block 24)
Return to T0 (step 29).

To protect the calculation against side channel attacks by differential power analysis (DPA), a masking of the exponent by a random number has already been provided by adding to the exponent a multiple of Euler's totient function, generally noted phi(N), prior to the calculation.

Such a solution is efficient against vertical attacks. However, the random number has no effect on horizontal attacks since they exploit a single trace, and thus a single execution depending on a single random number. The exponent obtained by the attacker (horizontal) is equivalent to the targeted secret.

Figure 3:
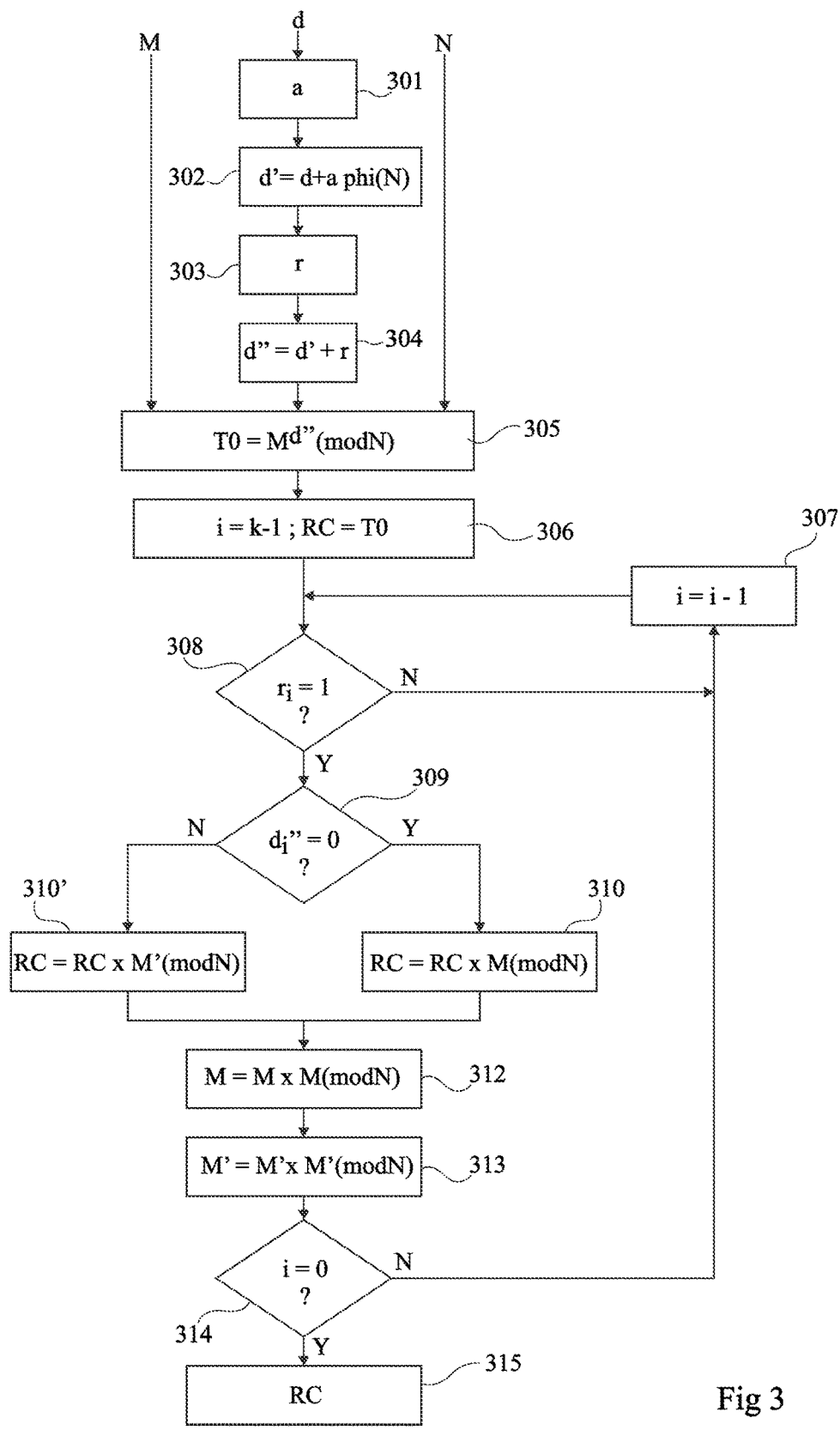
FIG. 3 shows, in the form of blocks, an embodiment of a method of protecting a modular exponentiation calculation.

FIG. 3 shows, in the form of blocks, an embodiment of a method of protecting a modular exponentiation calculation resisting horizontal side-channel attacks. As previously, the aim is to calculate value $C=M^d$ (mod N) by Montgomery's ladder method.

In FIG. 3, a complementary protection by masking of exponent d by a random number, by addition thereto of a random multiple of Euler's totient function of N (phi(N)), is also assumed. Thus, in a first step (block 301, a), a number a is selected, for example, a number independent from the keys and messages manipulated by the algorithm, which may be a random number. Then (block 302, d'=d+a.phi(N)), number a is multiplied by the Euler totient function of N, phi(N), and the result is added to exponent d.

In a second step (block 303, r), a number r is selected, for example, a number independent from the keys and messages manipulated by the algorithm, in an embodiment a random number r is selected which is of the same size as exponent d'. Then (block 304, d"=d'+r), number r is added (combined bit to bit by an XOR function noted+) to exponent d'. Thus, at the end of step 304, the exponent is altered by number r, which may be of same size as d'. The size (m bits) of exponent d" is generally different from the size (k bits) of original exponent d.

Message M is then submitted (block 305, $T0=M^{d''}$ (mod N)) to a modular exponentiation of exponent d", for example, of the type by Montgomery's ladder algorithm as discussed in FIG. 2. For example, the calculation uses two registers or memory locations of circuit 1 on which the operations will be performed. The message, for example, number M, to be submitted to the modular exponentiation is loaded into one of the registers and the other register T0 is initialized to one. Exponent d" is loaded into another register or is located in the memory ($d''_i$ representing each bit of exponent d", where i designates the rank in the range from 0 to m−1). At the end of the process, register T0 contains number $M^{d''}$ (mod N).

The correction process, which comprises a loop calculation on the bits of exponent d", is then started to correct the result. For example (block 306, i=k−1; RC=T0), a counter i is initialized to k−1 (size of the original exponent d having its altered bits desired to be corrected) and a calculation register (or memory location) RC is initialized to the value of register T0. Counter i is decremented by 1 (block 307, i=i−1) each time a bit $d''_i$ is processed as long as not all bits have been processed (block 314, i=0?).

At each iteration, that is, for each bit $d''_i$, it is determined (block 308, $r_i$=1?) whether the corresponding bit (of same weight) of number r is at state 1, that is, whether number r has altered this bit of exponent d'.

If it is not (output N of block 308), it is proceeded to the next bit of the exponent (block 307).

If it is (output Y of block 308), it is tested whether the bit of exponent $d''_i$ is 0 (block 309, $d''_i$=0?).

If current bit $d''_i$ is at 0 (output Y of block 309), the content of register RC is multiplied (modulo N) by message M and the result is placed in register RC (block 310', RC=RC.M (mod N)).

If current bit $d''_i$ is 1 (output N of block 309), the content of register RC is multiplied by the inverse of M (modulo N), noted M', and the result is placed in register RC (block 310', RC=RC.M' (mod N)). The modular inverse of M is number M' such that M.M'=1 (mod N).

Steps 310 and 310' correspond to, if number r has led to switching exponent d' from 1 to 0, multiplying the current correction value RC by the message and if, conversely, number r has led to switching exponent bit d' from 0 to 1, multiplying the current correction value RC by the inverse of the message.

Then, the content of register M is squared modulo N (block 312, M=M.M (mod N)) and the content of register M' is squared modulo N (block 313, M'=M'.M' (mod N)).

As long as not all the bits of exponent d" have been processed (output N of block 314), counter i is decremented and it is returned to step 307. Once all the bits of exponent d" have been processed (output Y of block 314), register RC contains the result of the modular exponentiation (block 315, RC), that is, value $C=M^d$(mod N), corrected.

As a variation, at step 306, register RC is set to 1 (instead of T0) and a step is added after step 315, where the result of step 315 is multiplied by T0.

An advantage of an embodiment described in relation with FIG. 3 is that the exponentiation is calculated on an altered exponent. Accordingly, a horizontal attack provides no indication relative to the exponent bit. In particular, it could have been devised to intervene on the exponent bit at each step. This would however have made the masking visible. Now, in an embodiment of FIG. 3, the modular exponentiation calculation process (block 305) is not modified otherwise than by its inputs (more particularly altered exponent d"). Accordingly, an attacker will think that he/she is processing, in a horizontal attack, a trace corresponding to the exponent, which is not true. Thus, the analysis of the trace in a horizontal attack becomes useless.

Another advantage of an embodiment is that such a countermeasure is efficient in case of vertical attacks, even if the masking by the multiple of phi(n) uses a small random number a at step 302.

The embodiment of FIG. 3 applies whatever the method used to perform the modular exponentiation. Indeed, masking operation 304 and unmasking operations 306 to 315 are independent from the steps carried out for the actual exponentiation (FIG. 2). Another exponentiation technique than Montgomery's ladder method may be used, for example, a so-called Yao or addition chain method.

Further, the protection process discussed in relation with FIG. 3 also applies to the protection of a calculation of scalar product of points on elliptic curves. Operations of scalar multiplication of points are used for calculations on elliptic curves, which form another category of encryption algorithms. A scalar multiplication comprises calculating result C of the multiplication of a point P of an elliptic curve G by an integer d (scalar), that is, applying formula:

$$C=dP.$$

Most often:

point P represents the number (or information representative of the number) which is desired to be encrypted, authenticated, signed, etc.; and scalar d and the curve (pair (d, G)) represent the encryption key, the authentication key, the signature key, etc. (or information representative of the key).

As for a modular exponentiation, the scalar multiplication on an elliptic curve by an electronic circuit (a state machine, a processor executing the method in the form of a program, a programmable logic circuit, etc.), for example, circuit 1, is most often performed by Montgomery's ladder method.

In the same way as for a modular exponentiation, it is provided to mask scalar d in a number d' by adding thereto a multiple of the order of the sub-group of the elliptic curve containing point P (d'=d+a.ord(P)), and then to apply a fault on scalar d' to obtain a value d" with which the scalar multiplication is performed, and eventually to correct the calculation once the calculation of d"P is over. The unmasking is corresponds to that performed in the case of modular exponentiation, by adapting the operations to those on the elliptic curves, that is, the products are replaced with additions of points, the squares are replaced with point doublings, and the inverse is replaced with the opposite of the point. Thus, as compared with FIG. 3, the input data are point P instead of message M, data M' are replaced with P=P', and the operations of modular multiplication are replaced with additions of points on an elliptic curve. Finally, the content of block 305 calculates a scalar multiplication instead of an exponentiation.

Various embodiments have been described. Various alterations, modifications, and improvements will readily occur to those skilled in the art. In particular, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
performing, using an electronic circuit, a modular calculation on a first number and a second number, the performing the modular calculation including:
combining the second number with a third number to obtain a fourth number;
executing the modular calculation on the first and fourth numbers, the result being contained in a first memory location;
initializing a second memory location; and
successively, for each bit of the third number at a first state:
in response to a corresponding bit of the fourth number being at a first state of two states, multiplying a content of the second memory location by an inverse of the first number and placing the result in the first memory location; and
in response to the corresponding bit of the fourth number being at a second state of the two states, multiplying the content of the second memory location by the first number and placing the result in the first memory location, wherein a result of the modular calculation on the first number and the second number is based on the content of the second memory location after processing of a last bit of the third number.

2. The method of claim 1 wherein the first memory location is a first register of the electronic circuit and the second memory location is a second register of the electronic circuit.

3. The method of claim 1, comprising:
in response to a bit of the third number being at a second state, proceeding to the next bit of the third number.

4. The method of claim 1 wherein the result of the modular calculation on the first number and the second number is, after processing of the last bit of the third number, in the second memory location.

5. The method of claim 1 wherein the third number is a random number.

6. The method of claim 1 wherein the second number is a result of a multiplication of a fifth number by an Euler totient function of a modulo of the modular calculation.

7. The method of claim 6 wherein the calculation is a modular exponentiation, the fifth number representing an exponent to be applied to the first number.

8. The method of claim 6 wherein the calculation is a scalar multiplication, the fifth number being a scalar to be multiplied by the first number.

9. The method of claim 1 wherein the calculation is a modular exponentiation, the second number representing an exponent to be applied to the first number.

10. The method of claim 1 wherein the calculation is a scalar multiplication, the second number being a scalar to be multiplied by the first number.

11. The method of claim 1 wherein the initializing the second memory location comprises initializing a value of the second memory location to one of:
a value of the first memory location; and
a value of one.

12. A device, comprising:
one or more memories; and
processing circuitry, which, in operation, performs a modular calculation on a first number and a second number, the performing the modular calculation including:
combining the second number with a third number to obtain a fourth number;
executing the modular calculation on the first and fourth numbers, storing the result in a first memory location;
initializing a second memory location; and
successively, for each bit of the third number at a first state:
in response to a corresponding bit of the fourth number being at a first state of two states, multiplying a content of the second memory location by an inverse of the first number and storing the result in the first memory location; and
in response to the corresponding bit of the fourth number being at a second state of the two states, multiplying the content of the second memory location by the first number and storing the result in the first memory location, wherein a result of the modular calculation on the first number and the second number is based on the content of the second memory location after processing of a last bit of the third number.

13. The device of claim 12 wherein the first memory location is a first register of the one or more memories and the second memory location is a second register of the one or more memories.

14. The device of claim 12 wherein the result of the modular calculation on the first number and the second number is, after processing of the last bit of the third number, in the second memory location.

15. The device of claim 12 wherein the third number is a random number.

16. The device of claim 12 wherein the second number is a result of a multiplication of a fifth number by an Euler totient function of a modulo of the modular calculation.

17. The device of claim 16 wherein the calculation is a modular exponentiation, the fifth number representing an exponent to be applied to the first number.

18. The device of claim 16 wherein the calculation is a scalar multiplication, the fifth number being a scalar to be multiplied by the first number.

19. The device of claim 12 wherein the calculation is a modular exponentiation, the second number representing an exponent to be applied to the first number.

20. The device of claim 12 wherein the calculation is a scalar multiplication, the second number being a scalar to be multiplied by the first number.

21. The device of claim 12 wherein the initializing the second memory location comprises initializing a value of the second memory location to one of:
a value of the first memory location; and
a value of one.

22. A system, comprising:
one or more processing cores, which in operation, process digital data; and
cryptographic circuitry, coupled to the one or more processing cores, wherein the cryptographic circuitry, in operation, performs a modular calculation on a first number and a second number, the performing the modular calculation including:
combining the second number with a third number, obtaining a fourth number;
executing the modular calculation on the first and fourth numbers, storing a result in a first memory location;
initializing a second memory location; and
successively, for each bit of the third number at a first state:
in response to a corresponding bit of the fourth number being at a first state of two states, multiplying a content of the second memory location by an inverse of the first number and storing the result in the first memory location; and
in response to the corresponding bit of the fourth number being at a second state, multiplying the content of the second memory location by the first number and storing the result in the first memory location, wherein a result of the modular calculation on the first number and the second number is based on the content of the second memory location after processing of a last bit of the third number.

23. The system of claim 22 wherein the first memory location is a first register and the second memory location is a second register.

24. The system of claim 22 wherein the modular calculation is one of a modular exponentiation and a scalar multiplication.

25. The system of claim 22 wherein the initializing the second memory location comprises initializing a value of the second memory location to one of:
a value of the first memory location; and
a value of one.

26. The system of claim 22 wherein the one or more processing cores, in operation, process transaction data.

27. A non-transitory computer-readable medium having contents which cause one or more processing devices to perform a method, the method comprising:
performing a modular calculation on a first number and a second number, the performing the modular calculation including:
combining the second number with a third number, obtaining a fourth number;
executing the modular calculation on the first and fourth numbers, storing a result in a first memory location;
initializing a second memory location; and
successively, for each bit of the third number at a first state:
in response to a corresponding bit of the fourth number being at a first state of two states, multiplying a content of the second memory location by an inverse of the first number and storing the result in the first memory location; and
in response to the corresponding bit of the fourth number being at a second state of the two states, multiplying the content of the second memory location by the first number and storing the result in the first memory location, wherein a result of the modular calculation on the first number and the second number is based on the content of the second memory location after processing of a last bit of the third number.

28. The non-transitory computer-readable medium of claim 27 wherein the modular calculation is one of a modular exponentiation and a scalar multiplication.

29. The non-transitory computer-readable medium of claim 27 wherein the initializing the second memory location comprises initializing a value of the second memory location to one of:
a value of the first memory location; and
a value of one.

30. The non-transitory computer-readable medium of claim 27 wherein the method comprises processing transaction data.

* * * * *